US009225672B1

(12) United States Patent
Dropps et al.

(10) Patent No.: US 9,225,672 B1
(45) Date of Patent: Dec. 29, 2015

(54) SYSTEMS AND METHODS FOR PACKET GROUPING IN NETWORKS

(71) Applicant: QLOGIC, Corporation, Aliso Viejo, CA (US)

(72) Inventors: Frank R. Dropps, Maple Grove, MN (US); Craig M. Verba, Maple Grove, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 312 days.

(21) Appl. No.: 13/678,385

(22) Filed: Nov. 15, 2012

(51) Int. Cl.
*H04L 12/861* (2013.01)
*H04L 12/801* (2013.01)
*H04L 12/851* (2013.01)

(52) U.S. Cl.
CPC .............. *H04L 49/90* (2013.01); *H04L 47/10* (2013.01); *H04L 47/2441* (2013.01)

(58) Field of Classification Search
None
See application file for complete search history.

(56) References Cited

U.S. PATENT DOCUMENTS

| | | | |
|---|---|---|---|
| 6,650,640 B1 * | 11/2003 | Muller | H04L 49/90 370/392 |
| 6,980,516 B1 * | 12/2005 | Wibowo et al. | 370/235 |
| 2002/0012340 A1 * | 1/2002 | Kalkunte | H04L 12/18 370/360 |
| 2003/0026267 A1 * | 2/2003 | Oberman | H04L 47/10 370/397 |
| 2004/0141501 A1 * | 7/2004 | Adams et al. | 370/389 |
| 2005/0047334 A1 * | 3/2005 | Paul et al. | 370/229 |
| 2007/0053296 A1 * | 3/2007 | Yazaki | H04L 47/10 370/235 |
| 2010/0118880 A1 * | 5/2010 | Kunz | H04L 49/10 370/401 |
| 2010/0329118 A1 * | 12/2010 | Adams | H04L 47/10 370/235 |
| 2011/0085567 A1 * | 4/2011 | Beecroft | 370/412 |
| 2012/0163396 A1 * | 6/2012 | Cheng et al. | 370/412 |
| 2012/0314703 A1 * | 12/2012 | Testa et al. | 370/389 |
| 2013/0136127 A1 * | 5/2013 | Hill | H04L 63/0245 370/392 |

* cited by examiner

*Primary Examiner* — Mohammad Adhami
*Assistant Examiner* — Vladislav Agureyev
(74) *Attorney, Agent, or Firm* — Klein, O'Neill & Singh, LLP (57) ABSTRACT

Methods and systems for packet grouping in a network are provided. A packet is received at a receive segment of a port of a first network device for transmission to a destination port of a second network device. The port determines if the packet is a start packet of a packet sequence. When the packet is not the start packet of the packet sequence, the port determines whether the packet has a destination that is the same as a destination of a last prior packet. When the packet is for the same destination, a grouping count is increased and the packet priority is elevated.

20 Claims, 10 Drawing Sheets

_(54)_ SYSTEMS AND METHODS FOR PACKET GROUPING IN NETWORKS

BACKGROUND

1. Technical Field

The present embodiments relate to packet grouping in networks.

2. Related Art

Computing systems, for example, servers, typically use adapters for sending out input/output requests. These adapters are referred to as host bus adapters when they handle information using a storage protocol, for example, Fibre Channel. The adapters are typically connected to a switch that is connected to a storage system where information is stored.

A physical adapter can be configured to support multiple virtual adapters, especially in virtual environments where virtual machines are used for reading and writing information. Each virtual adapters is associated with a separate firmware context that is maintained by the physical adapter at an adapter memory.

When multiple virtual machines issue input/output (I/O) requests for reading and writing information and a switch delivers the information for multiple contexts, it can take time for the computing system and/or adapter firmware to switch from one context to another. Continuous efforts are being made to better utilize computing resources while processing I/O requests.

SUMMARY

The present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one embodiment, a machine-implemented method for packet grouping in a network is provided. The method includes receiving a packet at a receive segment of a port of a first network device for transmission to a destination port of a second network device; determining if the packet is a start packet of a packet sequence; when the packet is not the start packet of the packet sequence, determining whether the packet has a destination that is the same as a destination of a last prior packet; when the packet is for the same destination, incrementing a grouping count and saving the packet destination; and elevating a priority of the packet.

In another embodiment, a network device is provided. The network device includes a base-port having a plurality of sub-ports configured to operate independently as a port for sending and receiving packets at a plurality of rates complying with a plurality of protocols; a shared temporary memory storage device having a plurality of storage locations that are used to store packets received by the plurality of sub-ports; and a routing sequencer for determining a destination for a packet received for a sub-port for transmission to a destination port of another network device. The routing sequencer is configured to determine if the packet is a start packet of a packet sequence; and when the packet is not the start packet of the packet sequence, determines whether the packet has a destination that is the same as a destination of a last prior packet; and when the packet is for the same destination, the routing sequencer increments a grouping count and saves the packet destination while elevating a priority of the packet.

In yet another embodiment, a machine-implemented method for packet grouping in a network is provided. The method includes receiving a packet at a receive segment of a port of a first network device for transmission to a destination port of a second network device; determining whether the packet has a destination that is the same as a destination of a last prior packet; when the packet is for the same destination, incrementing a grouping count and saving the packet destination; elevating a priority of the packet; sending a send request for the packet to a scheduler; and determining whether a group count has reached a maximum value; where the group count reaches the maximum value when a number of packets grouped together equals a programmed maximum number of packets that can be grouped together and when the group count has reached the maximum value, a routing sequencer for the network device clears a grouping state and the group count.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The various present embodiments now will be discussed in detail with an emphasis on highlighting the advantageous features. These embodiments depict the novel and non-obvious systems and methods for packet grouping in networks shown in the accompanying drawings, which are for illustrative purposes only. These drawings include the following figures, in which like numerals indicate like parts:

FIG. 1 is a functional block diagram of a network that the present embodiments may be used in connection with;

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). Machine-readable media may also encompass transitory forms for representing information, including various hardwired and/or wireless links for transmitting the information from one point to another.

The embodiments disclosed herein, may be implemented as a computer process (method), a computing system, or as an article of manufacture, such as a computer program product or non-transitory, computer-readable media. The computer program product may be computer storage media, readable by a computer device, and encoding a computer program of instructions for executing a computer process.

Various network standards and protocols may be used to enable network communications, including Fibre Channel (FC), Fibre Channel over Ethernet (FCoE), Ethernet, and others. Below is a brief introduction to some of these standards. The present embodiments are described herein with reference to the Fibre Channel and Ethernet protocols. However, these protocols are used merely for ease of reference and to provide examples. The present embodiments are not limited to Fibre Channel and Ethernet.

Fibre Channel (FC) is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches use memory buffers to hold frames received and sent across a network. Associated with these buffers are credits, which are the number of frames that a buffer can hold per Fabric port.

Ethernet is a family of computer networking technologies for local area networks (LANs). Systems communicating over Ethernet divide a stream of data into individual packets called frames. Each frame contains source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

Figure 1:
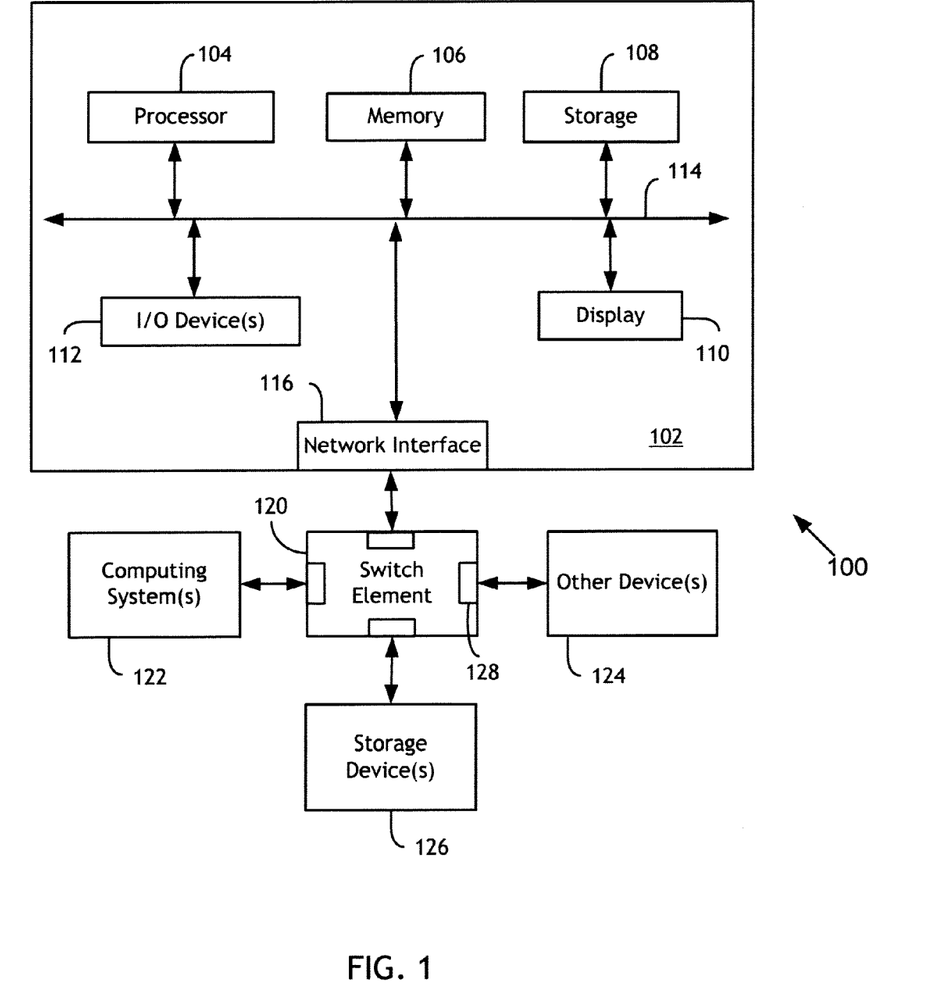

FIG. 1 shows an example of a system 100 that may be used in connection with the present embodiments. System 100 may include a computing system 102, which may be referred to as a host system. A typical host system 102 includes several functional components, including a central processing unit (CPU) (also referred to as a processor or processing module) 104, a host memory (or main/system memory) 106, a storage device 108, a display 110, input/output ("I/O") device(s) 112, and other components (or devices). The host memory 106 is coupled to the processor 104 via a system bus or a local memory bus 114. The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse, etc. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch element 120 and various links. The network interface 116 may comprise a network interface card (NIC) or any other device for facilitating communication between the host system 102, other computing systems 122, storage devices 126, and other devices 124. The network interface 116 may include a converged network adapter, such as that provided by QLogic Corporation for processing information complying with storage and network protocols, for example, Fibre Channel and Ethernet. As an example, the network interface 116 may be a FCoE adapter. In another embodiment, the network interface 116 may be a host bus adapter, for example, a Fibre Channel host bus adapter, such as that provided by QLogic Corporation. Details regarding the network interface 116 are not provided since they are not germane to the inventive embodiments described herein.

In one embodiment, the processor 104 of the host system 102 may execute various applications, for example, an e-mail server application, databases, and other application types. Data for various applications may be shared between the computing systems 122 and stored at the storage devices 126. Information may be sent via switch 120 ports. The term port as used herein includes logic and circuitry for receiving, processing, and transmitting information.

Each device (e.g. the host system 102, the computing systems 122, the storage devices 126, and the other devices 124) may include one or more ports for receiving and transmitting information, for example, node ports (N_Ports), Fabric ports (F_Ports), and expansion ports (E_Ports). Node ports may be located in a node device, e.g. network interface 116 of the host system 102 and an interface (not shown) for the storage devices 126. Fabric ports are typically located in Fabric devices, such as the switch element 120. Details regarding the switch 120 are provided below.

Figure 2A:
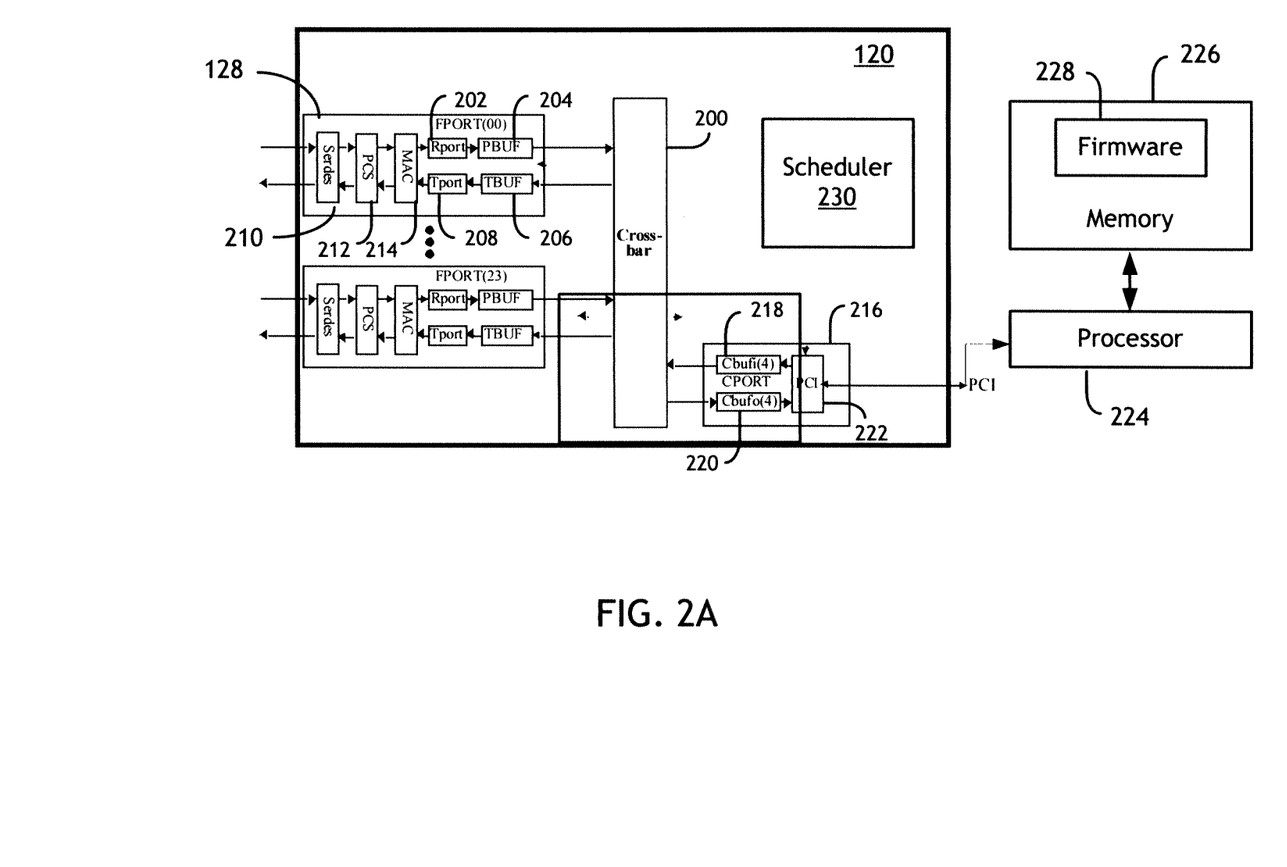
FIG. 2A is a functional block diagram of a switch element according to the present embodiments.

FIG. 2A is a high-level block diagram of the switch 120, also referred to as the switch element 120. Switch element 120 may be implemented as an application specific integrated circuit (ASIC) having a plurality of ports (or base-ports) 128. The ports 128 are generic (GL) and may include an N_Port, F_Port, FL_Port, E-Port, or any other port type. The ports 128 may be configured to operate as Fibre Channel, FCoE or Ethernet ports. In other words, depending upon what it is attached to, each GL port can function as any type of port. As an example, the ports 128 of FIG. 2A are drawn on the same side of the switch element 120. However, the ports 128 may be located on any or all sides of switch element 120. This does not imply any difference in port or ASIC design. The actual physical layout of the ports will depend on the physical layout of the ASIC.

Ports 128 communicate via a switch crossbar 200, which includes a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate the ports 128 plus a port 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared pipeline for receiving frames (or packets/information). The pipeline includes a serializer/deserializer (SERDES) 210, a physical coding sub-layer (PCS) 212, and a media access control (MAC) sub-layer 214. The SERDES 210 receives incoming serial data and converts it to parallel data. The parallel data is then sent to the PCS 212 and the MAC 214 for processing before being sent to a receive segment (or receive port (RPORT) 202.

The RPORT 202 temporarily stores received frames at a memory storage device, shown as PBUF (pause buffer) 204. The frames are then sent to a transmit segment (or transmit port (TPORT)) via the crossbar 200 and a transmit buffer (TBUF) 206. The TBUF 206 is a temporary memory storage device where frames or information related to frames are staged before being transmitted.

The switch element 120 may also include a control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 stores firmware instructions 228 for controlling switch element 120 operations.

The CPORT 216 includes an input buffer (CBUFI) 218, which is used to transmit frames from the processor 224 to the ports 128. The CPORT 216 further includes an output buffer (CBUFO) 220, which is used to send frames from the PBUFs 204, the TBUFs 206, and CBUFI 218 to the processor 224.

Port 128 described above may be referred to as a "base port" that may have more than one network link available for receiving and transmitting information. Each network link allows the base port to be configured into a plurality of independently operating sub-ports, each uniquely identified for receiving and sending frames. The sub-port configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel port, four single lane Fibre Channel port, two double lane Ethernet ports, 1 double lane Ethernet port and two single lane Ethernet ports, one double lane Ethernet port, one single lane Ethernet port and one single lane Fibre Channel port, one double lane Ethernet port and two single lane Fibre Channel port, one four lane Ethernet port or one four lane Fibre Channel port. Port 128 uses some logic that is shared among the multiple sub-ports and some logic that is dedicated to each sub-port.

Figure 2B:
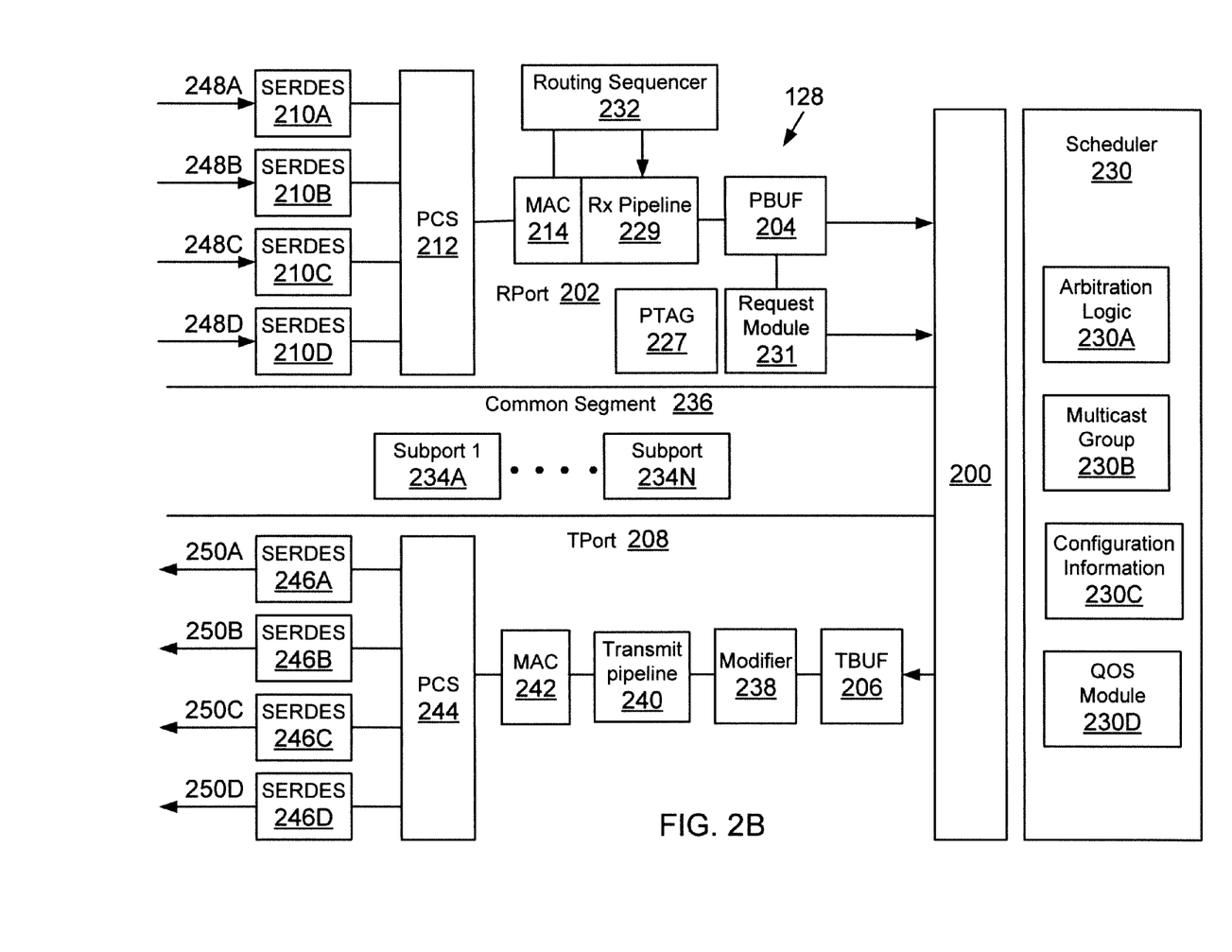
FIG. 2B shows a block diagram of a base-port, according to one embodiment.

FIG. 2B shows an example of base port 128 having RPORT 202, TPORT 208, and a common segment 236, according to one embodiment. RPORT 202 is used for receiving and processing frames, while TPORT 208 is used for transmitting frames. Common segment 236 is used to store configuration and status information that may be commonly used among different components of base port 128.

In one embodiment, base port 128 may be configured to include a plurality of sub-ports. The configuration, status, and statistics information/logic 234A-234N for each sub-port may be stored in common segment 236. The configuration logic 234A-234N may include look up tables or other data structures for storing configuration information.

RPORT 202 may include or be coupled to a plurality of network links, for example, four independent physical network links (or lanes) 248A-248D, each configured to operate as a portion of an independent sub-port within base port 128. Each network link is coupled to a SERDES 210A-210D, all of which share PCS 212 and MAC 214. The multiple lanes also share a receive pipeline 229 that is used for pre-processing received frames before they are transferred. Both MAC 214 and receive pipelines 229 are time multiplexed so that they can be shared among the plurality of links based on how the ports are configured to operate. In one embodiment, PCS 212 and MAC 214 may be a part of the receive pipeline 229.

Incoming frames are received via one of the network links 248A-248D. A received frame is processed by the appropriate SERDES and then sent to the PCS 212. After PCS 212 processes the frame, the frame is provided to MAC 212 that is time-shared among a plurality of sub-ports. Thus, for a certain time segment (for example, a clock cycle), MAC 214 may be used by one of the sub-ports. After the MAC 212 processes the frame it is sent to receive pipeline 229 that is also time-shared.

Information regarding the frame or a copy of the frame is also provided to a routing sequencer 232 that determines a destination for the received frame. In one embodiment, a frame whose destination is processor 224 is given the highest priority, followed by a frame that is routed by a TCAM (ternary content addressable memory) or steering registers located within the routing sequencer 232. More than one routing sequencer 232 may be used for each base port 128.

Frames that are ready to be sent out are staged at PBUF 204. PBUF 204 may have a plurality of queues (or slots) that may be referred to as receive queues. The receive queues temporarily store frames, until a request to move each frame is granted.

Information regarding the received frames may be stored at another memory device, shown as PTAG 227. The information at PTAG 227 may be referred to as tags that may have various fields. The various fields may include a transmit virtual queue number, a physical queue number, a transmit sub-port number, frame priority, an Ethernet type field, if any, a timestamp, error correction code and others. A tag is initialized when a frame is saved at a PBUF 204 queue. The tag is active as long as the frame is in the PBUF 204 queue. When the receive queue location is empty, the tag is marked invalid. The tags are created and used by a read module and write module (not shown) that manages read/write operations to and from PBUF 204. PTAG 227 may also be used to stage requests for moving frames stored at the PBUF 204 receive queues, before the requests are sent to scheduler 230, as described below.

To move frames from the receive queues, a request module 231 generates requests for a global scheduler 230, also referred to as scheduler 230. Request module 231 maintains a data structure (not shown) that tracks a number of requests that may be pending for each sub-port. Request module 231 also removes requests from the data structure when a grant is received for a particular request.

Scheduler 230 includes arbitration logic 230A that performs dual stage arbitration for processing requests from various base ports. Scheduler 230 also maintains a data structure at a memory labeled as multicast group 230B. The data structure stores information for identifying multicast groups that may receive multicast frames, e.g., frames that are destined to multiple destinations. Scheduler 230 stores configuration information 230C for various ports and some of that information may be used to select requests. Global scheduler 230 also includes a quality of service (QOS) module 230D for providing QOS for various sub-ports. Details regarding QOS module 230D are provided below.

Frames for transmission via TPORT 208 move via TBUF 206 and a modifier 238. In one embodiment, modifier 238 may be used to insert or remove information from an outgoing frame. The modification may be based on the frame type. The time-shared transmit pipeline 240 and MAC 242 are used to process outgoing frames. PCS 244, SERDES 246A-246D are used similarly to PCS 212 and SERDES 210A-210D. Network links 250A-250D are similar to links 248A-248D, except links 250A-250D are used to transmit frames. Furthermore, although separate MAC and PCS are shown for the transmit segment, the same PCS 212 and MAC 214 of the receive segment may be used in the transmit segment.

Figure 3:
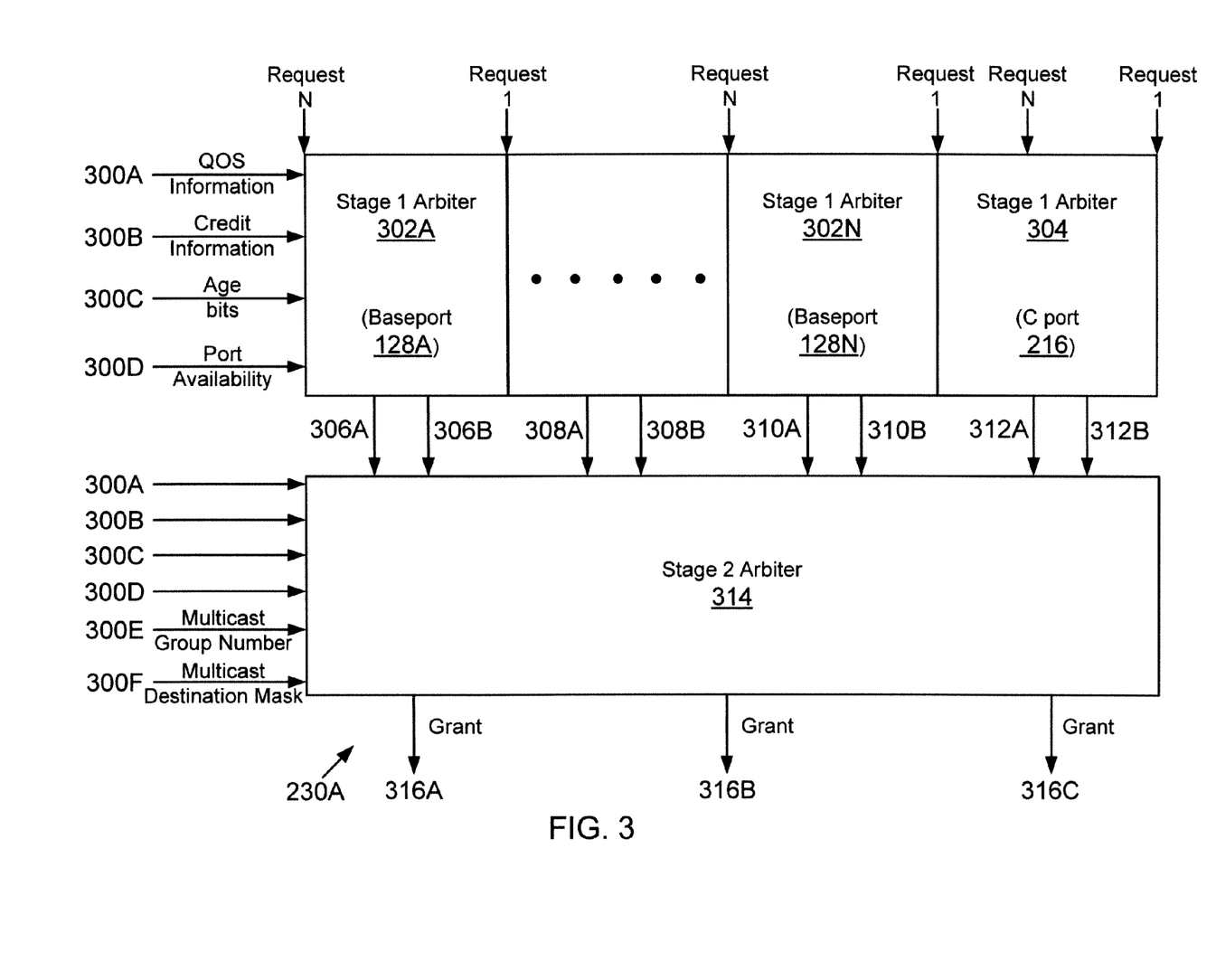
FIG. 3 is a functional block diagram of arbitration logic, according to one embodiment.

FIG. 3 is a functional block diagram of arbitration logic 230A, according to one embodiment. Arbitration logic 230A performs dual stage (or multi stage) arbitration for selecting requests for transmitting frames that have been received at one or more RPORTs 202. The first stage selects more than one request (for example, two) from each base-port 128. The second stage then selects a request from among the requests that are selected in the first stage. In one embodiment, there are multiple requests and grants processed simultaneously.

The first stage may include a plurality of arbitration modules ("arbiters") 302A-302N, 304. Arbiters 302A-302N receive requests (shown as Request 1 through Request N) from each base-port shown as base-port 128A-128N. In one embodiment, each base-port may send 32 requests to each stage one arbiter. Arbiter 304 may be dedicated for processing requests that are received only from CPORT 216.

Each request received by a stage one arbiter is identified by a request number and also includes the identity of the sub-port of the base-port 128 that generates the request. The request number also includes the RPORT receive queue number providing the physical location where the frame may be stored at the RPORT. The request further includes a code that identifies the type of requests, e.g. whether the request is for the CPORT, and whether the request is for a unicast frame or a multicast frame (meant for more than one destination). If the request is for a multicast group, then the request includes an identifier identifying the multicast group. Each request also includes an identifier that identifies a destination sub-port.

Each request from a base-port includes a destination transmit virtual queue number. This is used to identify one of the virtual transmit queues maintained at the transmit port that is being requested by a particular request. The virtual transmit queues are used to store a QOS number for a QOS bin, described below, and information for translating a frame, when required. The request may also include a transmit port physical queue number field that is used to identify a physical transmit queue that is maintained at the destination sub-port.

Each request also includes a tag that includes a priority code and priority information for the request. The priority information is used by the stage one arbiter to select one of the requests from among a plurality of requests. How the priority code from the request is applied depends on how the request destination transmit virtual queue is configured for processing in the scheduler. Each virtual transmit queue may be configured in the scheduler 230 for processing as high priority, fixed priority, QOS priority, or QOS rigid priority. A high priority is the highest priority level, followed by fixed priority, QOS priority, and QOS rigid priority.

QOS is a method of controlling the amount of bandwidth that is allowed from various source ports to a specific destination sub-port's set of virtual transmit queues. The global scheduler 230 may be used to allocate the bandwidth to a specific destination sub-port on a percentage basis from among a plurality of groups of source traffic. The groups may be referred to as Enhanced Transmission Selection (ETS) classes.

In one embodiment, each sub-port's TBUF may include a plurality of source traffic group structures called QOS-Bins. Details of QOS bins are provided in co-pending patent application, entitled Systems and Methods for Quality of Service in Networks, incorporated herein by reference in its entirety. The QOS bin may be used to monitor the bandwidth consumed by its source traffic group and then adjust the QOS priority for the transmit virtual queues that are used by the source traffic groups. The QOS priority is changed dynamically as frames are transmitted. The QOS bins may be maintained by QOS module 230D. QOS rigid priority is similar to QOS priority except transmission of that data flow is stopped when the allocated maximum bandwidth is reached.

To select a request for a base-port, arbiters 302A-302N, 304 receive real time inputs 300A-300D, according to one embodiment. Input 300A includes QOS information. The QOS information is the dynamically changing QOS Priority of the QOS bins as shown in Table I below:

TABLE I

| QOS Priority | QOS Priority Definition | Comment |
| --- | --- | --- |
| 7 | $X < \frac{1}{4}$ Min | Highest Priority |
| 6 | $\frac{1}{4}$ Min $\leq X < \frac{1}{2}$ Min | |
| 5 | $\frac{1}{2}$ Min $\leq X < \frac{3}{4}$ Min | |
| 4 | $\frac{3}{4}$ Min $\leq X <$ Min | |
| 3 | Min $\leq X < \frac{1}{2}$ Max | |
| 2 | $\frac{1}{2}$ Max $\leq X < \frac{3}{4}$ Max | |
| 1 | $\frac{3}{4}$ Max $\leq X <$ Max | |
| 0 | $X \geq$ Max | Lowest Priority |

Where: Min=TBUF 206 configuration QOS bin entry minimum bandwidth limit threshold value; Max=TBUF 206 configuration QOS bin entry maximum bandwidth limit threshold value; and X=TBUF 206 configuration QOS bin entry actual bandwidth consumed counter value.

Input 300B provides credit information for each transmit physical queue of a sub-port that has sent a request to a stage one arbiter. A network link partner's receiving port, typically has limited receive buffer space to store packets. The link partner's port reports its available space to transmitting ports as "credits" e.g. available storage space to store frames or uses a pause frame exchange to indicate lack of frame storage space. If the link partner's receive buffer storage is full and it cannot take any more frames, it means it is out of credit. When a transmit physical queue of a transmitting port has zero credit, it means that it cannot transmit any frames associated with that transmit physical queue. Input 300B is used to determine if a transfer can occur because credit is available or has to wait until credit is unavailable at a destination link partner port. A link partner is another device that is not a part of switch element 128, for example, devices 122, 124, 126 (FIG. 1). Arbiters 302A-302N, 304 use the credit information to select a request as described below in detail.

Input 300C provides age information for each request. The age information is used as a tie-breaker to select a request from among a plurality of pending requests that may have the same priority. The age information 300C may be provided as age bits that indicate the relative age between requests. This allows stage one arbiters to select older requests having the same priority.

Input 300D are signals from each sub-port indicating whether the sub-port is available to receive frames from the crossbar 200 into TBUF 206 for transmission. This may be indicated by a single "available" bit. In one example, a bit value of 1 may indicate that a sub-port is available. The CPORT 216 may also send a bit value to indicate whether it is available or not. A sub-port may not be available at any given time if that is it's configured state by processor 224 or if it is currently busy processing a frame.

Arbiters 302A-302N, 304 may select two request for each base-port 128. The qualified request may be selected based on the priority code, and, if the priority code is the same, then age bits may be used to select the oldest requests from among the highest priority qualified requests. A qualified request is one with a destination sub-port that is available and a transmit physical queue that has credit. In other words, qualified requests are requests where resources to process the request and transmit the frame are available. The requests selected from the first stage (e.g. 306A/306B, 308A/308B, 310A/310B, 312A/312B) are sent to a second stage (or stage two) arbiter 314 that performs a second arbitration step.

Similar to the stage one arbiters, the second stage arbiter 314 also receives inputs 300A, 300B, 300C, 300D. In addition, second stage arbiter 314 receives input 300E for a multicast group and a destination mask 300F for handling multicast requests. In one embodiment, a multicast group maps a multicast group number 300E to a destination mask 300F that may be used by arbiter 314 to determine destination ports for a frame. The multicast group information may be stored in a static random access memory 230B (labeled as multicast group, FIG. 2B) accessible to scheduler 230. The use of inputs 300E, 300F in the second stage arbitration is described below.

Second stage arbiter 314 first selects the qualified requests based on priority. If there is more than one qualified request with the same highest priority, then age is used to select the oldest request from among the high priority requests. In one embodiment, the age could be replaced by round-robin to select a request when there is more than one qualified request with the same highest priority. In another embodiment, if more than one qualified request has the same highest priority and age then a round robin mechanism may be used to select one of the qualified requests having the same age and priority. In the illustrated embodiment, if two or more requests are asserted in a same clock cycle the age bit that represents the relative age between the two different requests has its value toggled. This toggling has the effect of rotating through requests' age if a timestamp mechanism is used to provide age information of requests instead of the relative age bits used in the illustrated embodiment.

After the second stage arbitration, a grant pair (for example, a PBUF grant 316A and a TBUF grant 316B, a PBUF grant 316A and a CBUFO grant 316C, or a CBUFI grant and a TBUF grant 316B) is generated and sent to the appropriate sub-port(s). In one embodiment, only one grant type is sent to the same port within a clock cycle. In other words, only one PBUF grant 316A and only one TBUF grant 316B will be sent to a given port at the same time, in the same clock cycle. Multiple grant pairs may be sent to sub-ports belonging to other base-ports within the same clock cycle.

The PBUF grant 316A identifies the request and includes a grant code that may be used to indicate if the grant is a unicast grant, a partial multicast grant, a completed multicast grant, or is not a grant. The grant code may be a 2-bit value, for example. The PBUF receiving the grant deactivates the request for certain clock periods.

When a TBUF receives a grant it also deactivates the signal indicating that it is "available" for the sub-port that got the grant. This prevents any grants for requests that have the same destination sub-port. After a transfer, the destination sub-port becomes available again as indicated by input 300D to the stage one and second stage arbiters.

In one embodiment, the TBUF grant 316B may also include a grant code similar to the PBUF grant. The TBUF grant also identifies a destination sub-port, a source base-port identifier, a transmit port virtual, and a physical queue number. The CBUF grant 316C includes a source base-port number and an indicator indicating if the grant is valid or not.

Figure 4:
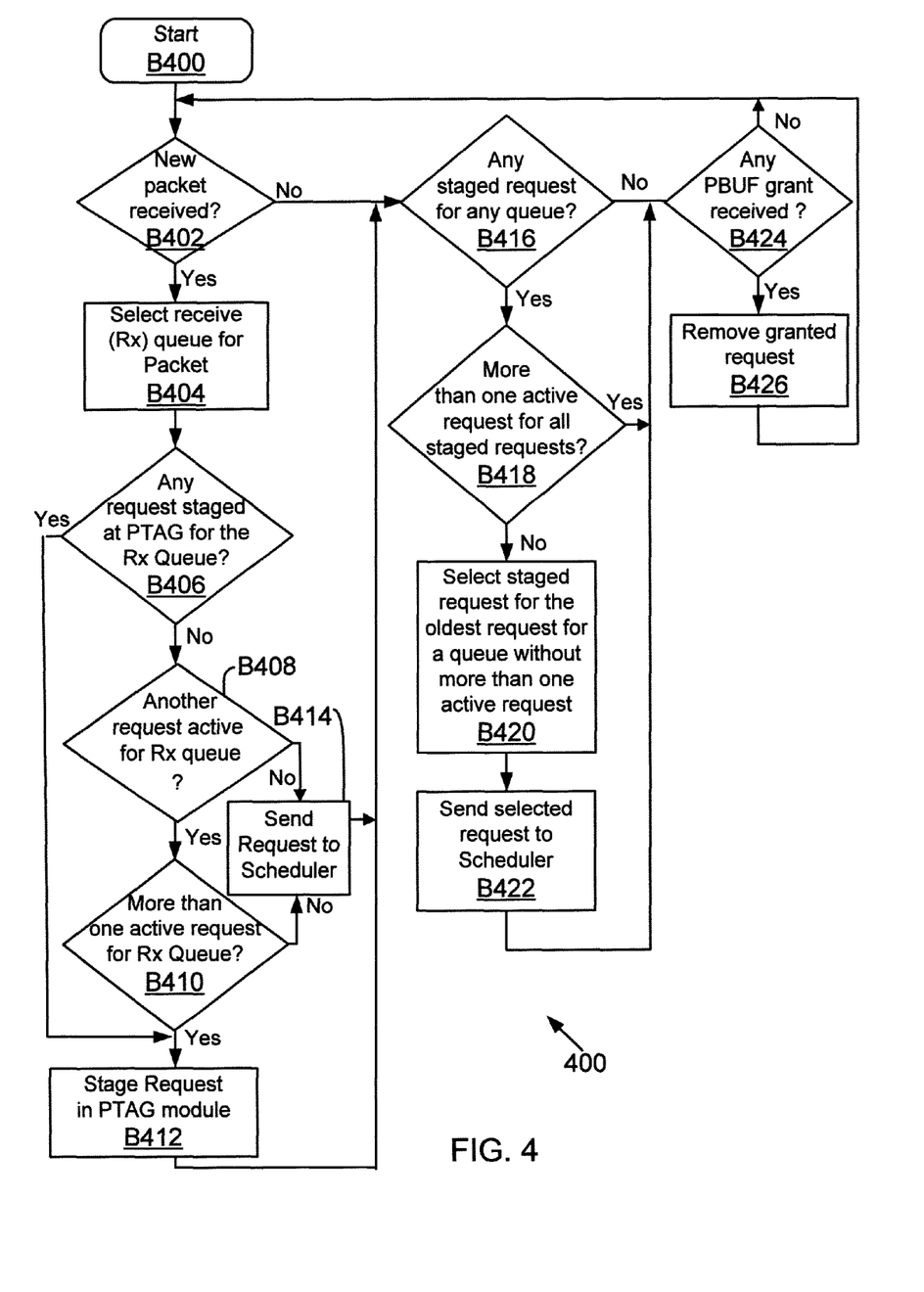
FIGS. 4-6 are process flow diagrams, according to the present embodiments.

The arbitration process used by the global scheduler 230 is described below with respect to FIGS. 4-6. FIG. 4 shows a process 400, according to one embodiment. The process begins in block B400. In block B402, the process determines if a new packet has been received at a RPORT 202 of a sub-port. If a new packet has been received, then in block B404, a PBUF receive queue is selected for the new packet and the process advances to block B406.

In block B406, the request module 231 determines if any requests for the receive queue selected in block B404 are staged at PTAG 227. If there are no requests for the selected receive queue staged in PTAG 227, then the process advances to block B408.

In block B408, the request module 231, determines if another request from the same selected receive queue is active i.e. pending a grant. If there is another request active for the selected receive queue, in block B410, the request module 231 determines if more than one request is active from the same selected request queue. If more than one request is active, then the request is staged at PTAG 227. If more than one request is not active, then the request is sent to the appropriate stage one arbiter of scheduler 230 in block B414. If another request is not active, as determined in block B408, then the request is sent to the scheduler 230 in block B414. If, in block B406, there is a staged request for the selected receive queue, then in block B412, the new request gets staged at PTAG 227 behind the ones already staged for the same selected receive queue.

Referring back to block B402, if a new packet has not been received, then in block B416 the request module 231 determines if there are any staged requests in PTAG 227 for any receive queue. If it is determined that there are some staged requests in PTAG 227, then in block B418, the request module 231 determines if more than one request is active from the list of the receive queue. If more than one request is active for all of the staged requests, then the process advances to block B424. In block B424, the request module 231 determines if a grant has been received from scheduler 230. If a PBUF grant is received, then it is removed from the appropriate receive queue in block B426 and the process moves back to block B402. If no PBUF grant is received, then the process moves back to block B402.

Referring back to block B418, if there are staged requests for receive queues that do not have more than one request pending, then in block B420 the oldest staged request is selected and the process advances to block B422. In block B422, the oldest staged request is sent to the scheduler 230 by the request module 231. The process then advances to block B424.

Figure 5A:
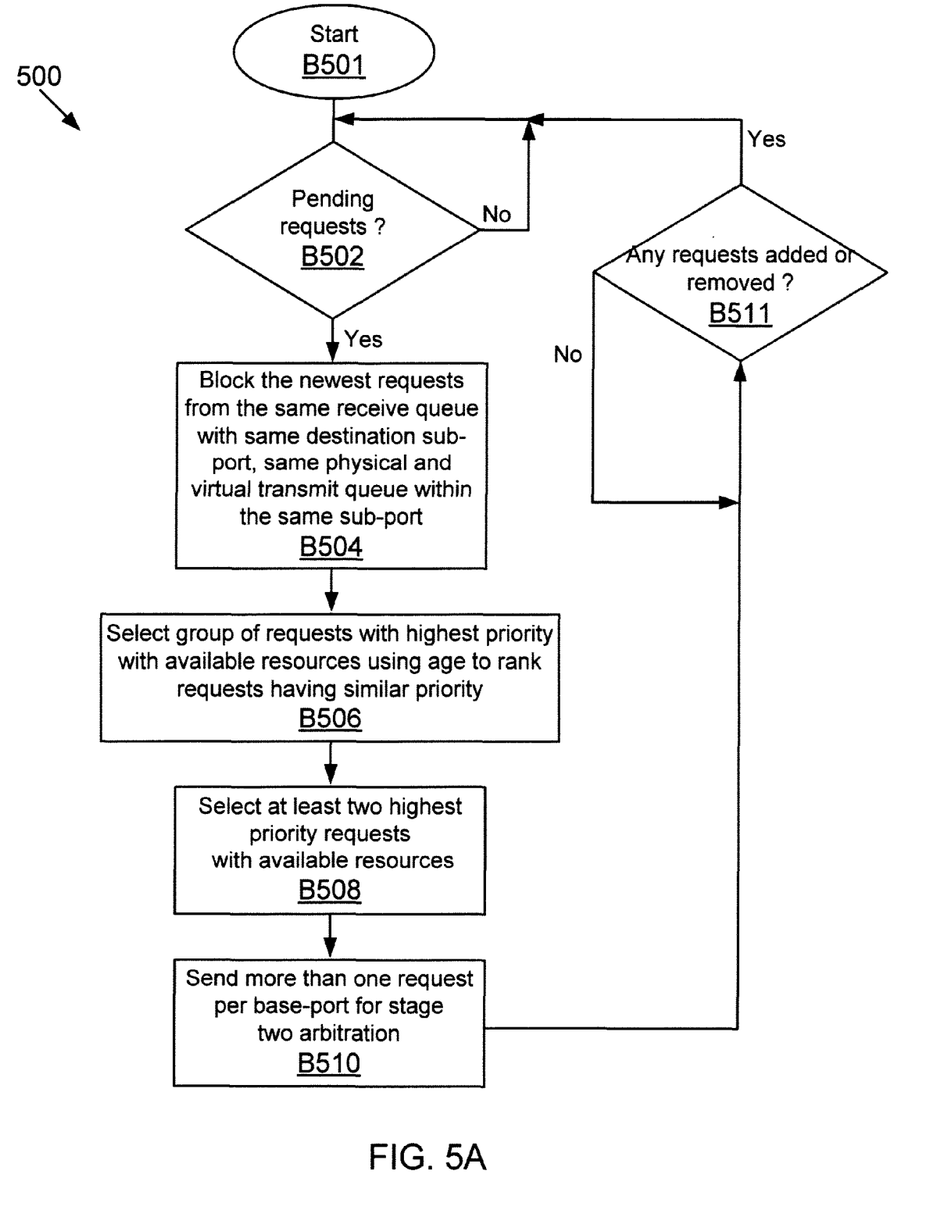

FIG. 5A illustrates a process 500 for arbitrating between a plurality of stage one requests, according to one embodiment. The process begins in block B501. In block B502, the arbiter for a base-port (for example, 302A) determines if there are any pending requests. If yes, then in block B504, any requests from the same receive queue and destined for the same sub-port and same physical transmit queue and the same virtual transmit queue are blocked. In block B506, a group of requests with the highest priority and available resources e.g. credit, available destination sub-port etc., are selected. The priority is determined from the priority code in a request tag and the transmit virtual queue configuration, while resource information may be obtained from inputs 300A-300D that are described above.

In block B508, at least two of the highest priority requests are selected. If there are requests with the same priority, then the oldest of the requests having the same priority are selected. In block B510, the selected requests are sent to the stage two arbiter 314. In block B511, the arbiter determines if any new requests have been made or if any previously pending requests have been removed. If yes, then the process goes back to block B502. If no, the process stays at block B511 waiting for a change.

Figure 5B:
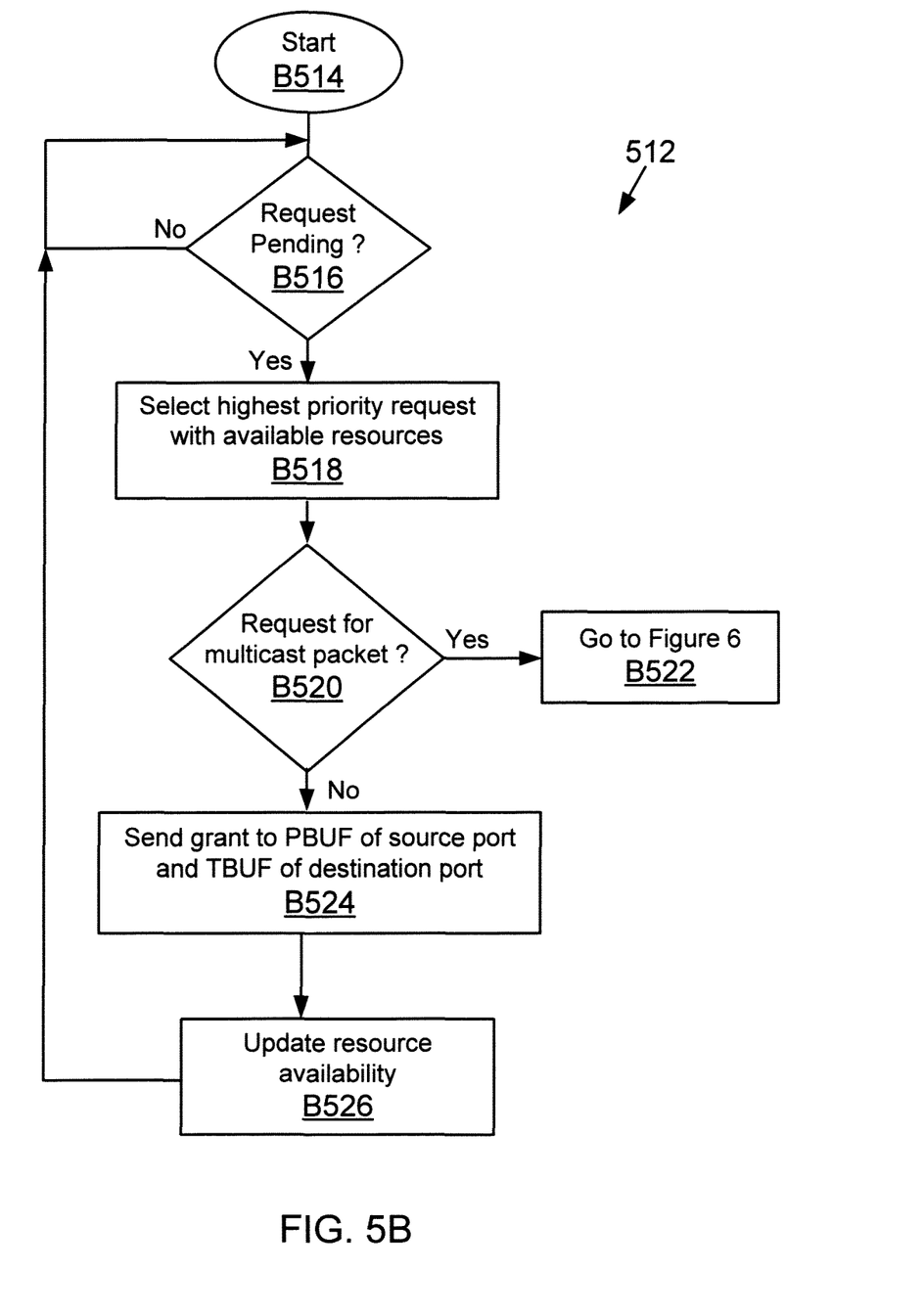

FIG. 5B illustrates a process 512 for selecting requests in stage two, according to one embodiment. The process starts in block B514. In block B516, the stage two arbiter 314 determines if there are any pending requests. If there are no pending requests, then the arbiter simply waits. If there are pending requests, then in block B518 the request with the highest priority is selected. The priority of a request may be determined from the priority code of each request tag and the transmit virtual queue configuration. Once again, if there are requests that have the same priority, then the oldest request from among the requests with the same priority is selected.

In block B520, arbiter 314 determines if the packet for the selected request is a multicast packet. If yes, then the process moves to FIG. 6 in block B522. If the request is not for a multicast packet, then a grant is sent to the PBUF of the source sub-port and the TBUF of the destination sub-port. Thereafter, in block B526, the resources used to process the grants become "unavailable."

Figure 6:
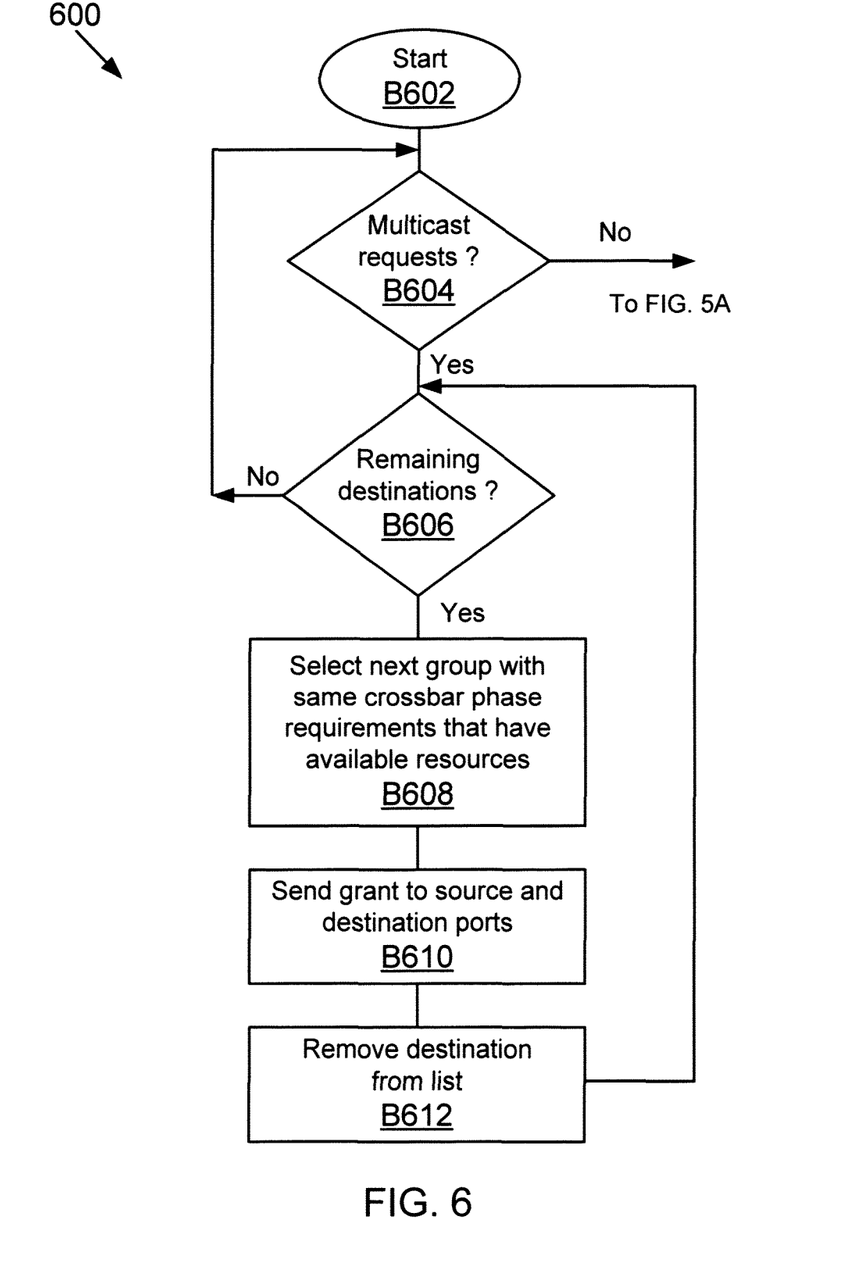

FIG. 6 illustrates a process 600 for handling multicast packets, according to one embodiment. The process begins in block B602. In block B604, stage two arbiter 314 determines if there are any multicast requests. If there are no multicast requests, then the process simply loops back to FIG. 5A.

If there are requests, then in block B606, arbiter 314 determines if there are any remaining destinations to send the multicast frames. If there are no remaining destinations, then the process loops back to block B604.

If there are remaining destinations in block B606, then in block B608 the destination mask is determined by reading the multicast group memory location specified in the multicast group number field. Arbiter 314 selects the next group of destinations that share the same crossbar phase requirements and have available resources. Arbiter 314 is aware of the phase requirements corresponding to sub-ports based on configuration information 230C. The crossbar 200 is time multiplexed where each sub-port of a base-port is allocated a time window. Thus, each TBUF of a base-port has four phase windows to transmit frames. The manner in which the phase windows are used depends on how a port is configured. For example, if all the sub-ports are configured to operate as single lanes, then each gets an equal phase window to access crossbar 200. If two sub-ports are configured as single lane and the other two are configured to operate as a single dual lane sub-port, then the dual lane sub-port gets half of the total time window, while each of the single lane ports get a quarter of the total time window.

Thereafter, in block B610, a grant is sent to the source and destination sub-ports. The destinations that receive the multicast frame are removed from the pending destinations list in block B612.

Figure 7A:
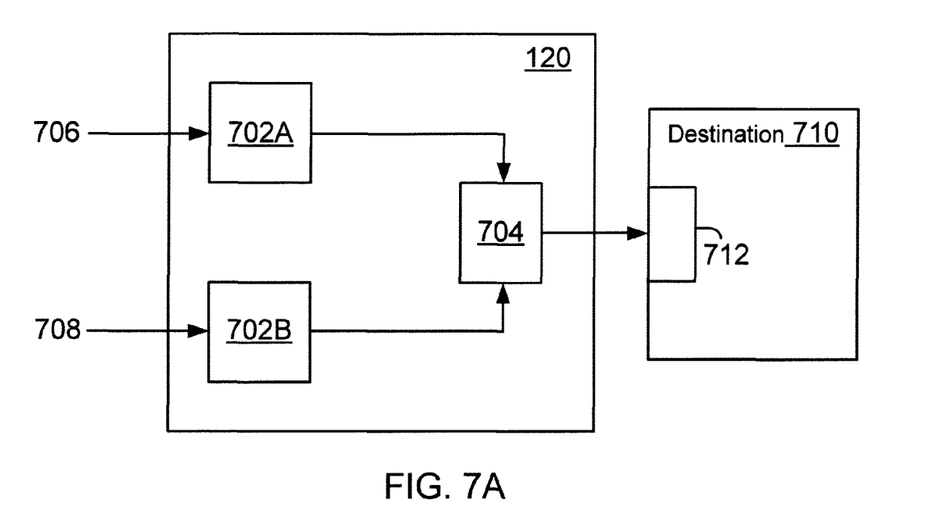
FIG. 7A is a functional block diagram of a network device sending packets to a destination, according to the present embodiments.

FIG. 7A illustrates an example of a switch element 120 having two ports 702A, 702B for sending packets received via links 706, 708 to port 704. Port 704 is the transmitting port that may then send the received packets to a destination 710 having a port 712. In one embodiment, port 712 may be an adapter port at destination 710. Generally, when two or more ports have packets to transmit through a common transmit port 704, the requests for transmitting the packets are typically selected for transmission according to the arbitration scheme described above in FIGS. 4-6.

Figure 7B:
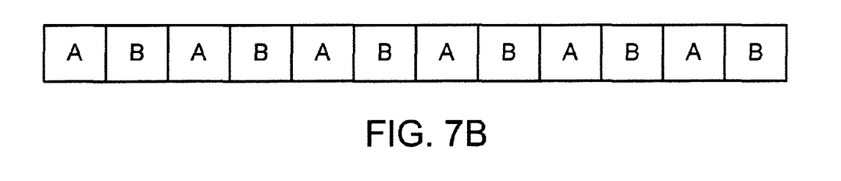
FIGS. 7B and 7C are functional block diagrams of example patterns of packet transmission.
Figure 7C:
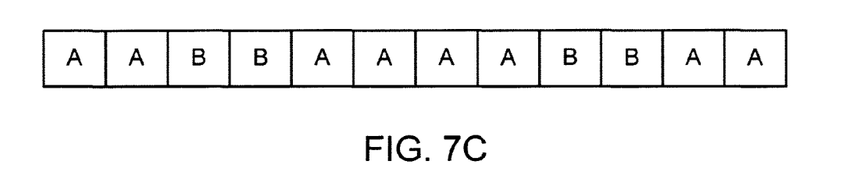

In one embodiment, packets received at either port 702A, 702B may be of the same sequence or context, for example, for a same read or write operation initiated by a computing system. The sequence may be detected from a header field of a received packet by routing sequencer 232. When packets of a same sequence and the same destination have to be transmitted from the same source port (for example, port 702A) to the same destination (for example, 710), then it may be more efficient to allow the transmitting port (704) to select frames from the same source in sequence and transmit the frames to the destination. The present embodiments use an arbitration scheme that artificially raises the priority of subsequent packets from a given source after that source has provided a start-of-sequence packet. This arbitration scheme results in packets from a same source port being grouped together for sequential transmission, thereby increasing transmission efficiency. The benefit of the present embodiments is illustrated in FIGS. 7B and 7C. The final destination devices may also be able to process group frame sequences more efficiently because of reduced overhead.

FIG. 7B illustrates a packet sequence that can result when round robin arbitration is used to transmit packets that have been received at ports 702A, 702B and both ports request access to port 704 at the same time. In this situation, the priority of each port will alternate so that packets will be transmitted in alternating fashion, e.g. A-B-A-B-A-B, etc., where "A" signifies packets from port 702A and "B" denotes packets from port 702B. This pattern of packet transmission is inefficient, because each time a packet is received at the destination port 712, the destination port must switch to a different context if the received packet is not of the same context as a last-received packet. Thus, in the example of FIG. 7B, the destination port 712 would be required to continually switch back and forth between the contexts for packets received from ports 702A, 702B. This process is inefficient and undesirable.

FIG. 7C illustrates a packet sequence that can result when arbitration according to the present embodiments is used for transmitting packets from the same sequence to the same destination. As shown, packets are grouped in groups of two, e.g. A-A-B-B-A-A-B-B-A-A-B-B, etc. This grouping results from artificially raising the priority of subsequent packets from source port 702A after port 702A has provided a start-of-sequence packet, as described below with reference to FIG. 8. While in FIG. 4B the packets are grouped in groups of two, in other embodiments the packets could be grouped in groups of any number. However, it has been found that groups of two to four provide the desired efficiency.

In the present embodiments for packet grouping, one mechanism that can be used to pseudo-group packets together is a priority feature used by the scheduler 230. As described above, PBUF requests to the scheduler 230 have a priority field that may be inserted by routing sequencer 232. When packet grouping is enabled for port 704 (FIG. 4) and destination 710, the route sequencer 232 assigns the request priority of the first packet of a sequence as a "normal" request priority. Sequential packets for the same sequence and destination receive an elevated request priority until the maximum number of packets that can be grouped together is reached. As discussed above, the maximum number is a programmed value, and can be any number, but grouping packets into groups of two to four provides satisfactory results. At any time during a packet sequence, if the current packet destination is different than the previous packet, the request priority of that packet reverts to the "normal" request priority and the sequence starts anew.

Figure 8:
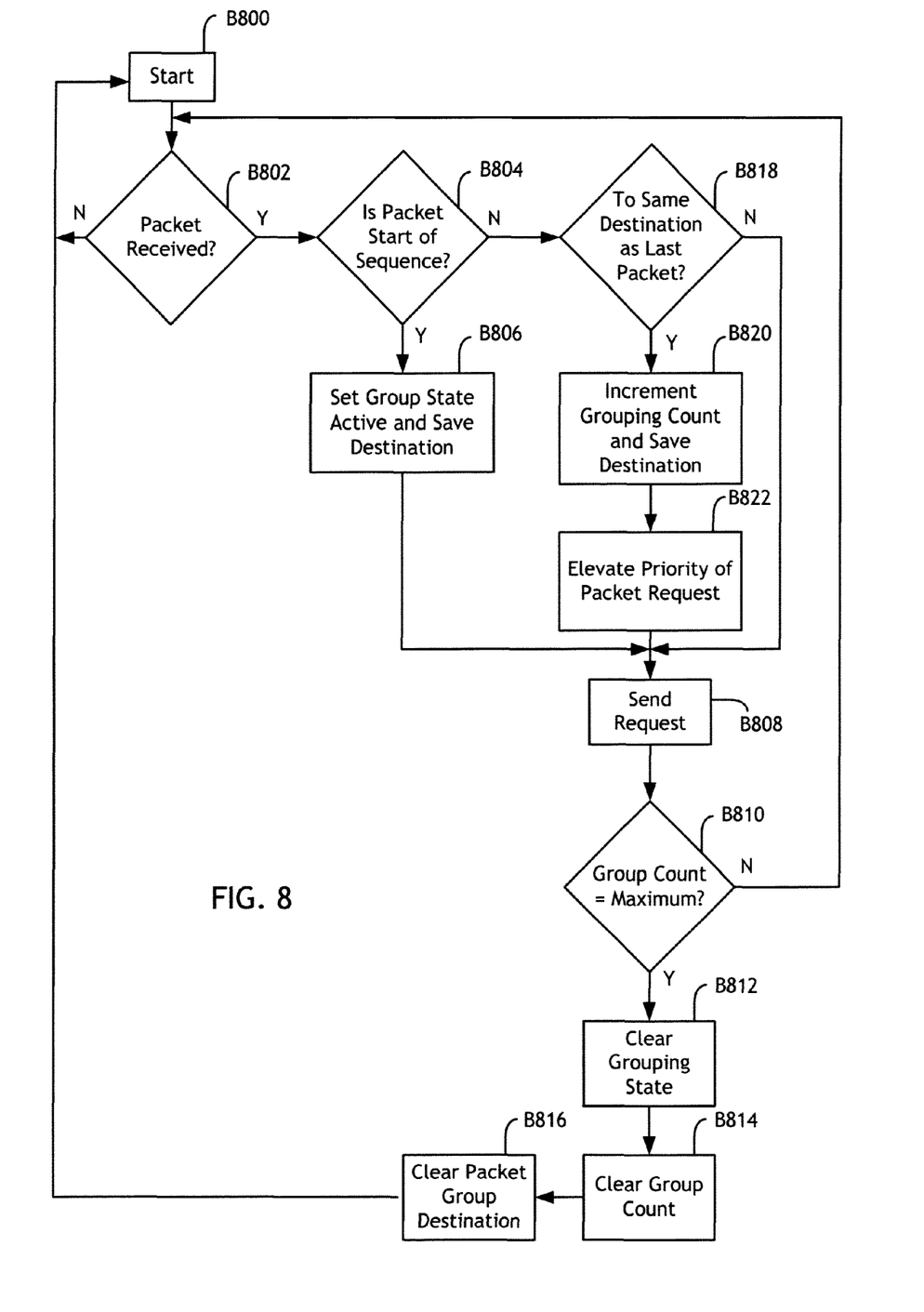
FIG. 8 is a flowchart illustrating one embodiment of the present methods for packet grouping in networks.

FIG. 8 is a flowchart illustrating one embodiment of the present methods for packet grouping in networks. The process starts at block B800 and proceeds to block B802, where it is determined if a packet has been received at a receive port for transmission to a destination port. If the answer is no, then the process reverts to block B802. However, if the answer is yes, then the process advances to block B804, where it is determined if the received packet is the start of a sequence. Routing sequencer 232 examines the packet's header and determines if a flag or a bit value is set to determine that the packet is the start of a sequence. If the answer is yes, the process advances to block B806, where the group state is set to active and the destination of the packet is saved. The routing sequencer 232 saves the destination and group state information at a memory location (not shown). The memory location may be local to the routing sequencer 232 or may be located anywhere else, but is accessible to the routing sequencer 232. Saving the packet destination enables the destinations of future packets to be compared to the saved destination, as discussed further below.

Reverting to block B804, if it is determined that the received packet is not the start of a packet sequence, then the process advances to block B818. At block B818 it is determined whether the packet has the same destination as the last packet. If the answer is no, then the process advances to block B808 and the subsequent blocks, which are described below. However, if the answer is yes, then the process advances to block B820, where a group count is incremented and the destination of the packet is saved. In one embodiment, routing sequencer 232 uses a counter (not shown) for maintaining the group count. The group count is used to limit the number of packets/destinations that can be grouped. The process then advances to block B822, where the priority of the packet is elevated by routing sequencer 232. The process then advances to block B808 and the subsequent blocks, which are described below.

In block B808, a send request for the packet (e.g. with or without the elevated priority) is sent to the global scheduler 230. The process then advances to block B810, where it is determined whether the group count has reached the maximum. The group count reaches the maximum when the number of packets grouped together equals a programmed maximum number of packets that may be grouped together. If the answer is no, then the process reverts to block B802. However, if the answer is yes, then the process advances through blocks B812, B814 and B816, where the grouping state is cleared by routing sequencer 232, the group count is cleared by routing sequencer 232, and the packet group destination is also cleared by the routing sequencer 232. The process then reverts to block B802.

The present embodiments advantageously group packets together when those packets are part of the same sequence and are bound for the same destination port. The destination port thus does not have to change contexts as frequently, which creates more efficient communication.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. For example, the embodiments described above may be implemented in adapters, network cards and other similar devices. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A machine-implemented method for packet grouping in a network, the method comprising:
    receiving a packet at a receive segment of a port of a first network device for transmission to a destination port of a second network device;
    determining if the packet is a start packet of a packet sequence;
    when the packet is the start packet of the packet sequence, activating a group state that enables elevating processing priority for packets having a same destination;
    storing group state information and packet destination of the received packet;
    when the packet is not the start of the packet sequence but has a same destination of a last received packet, then:
        incrementing a group count, where the group count limits a number of grouped packets whose priority is elevated due to the same destination;
        elevating a priority of the received packet;
        sending a request for processing the received packet with elevated priority; and
        disabling priority elevation for packets with the same destination by clearing the group state, the stored destination and the group count, when the group count has reached a maximum count value.

2. The method of claim 1, wherein the request for processing the packet is sent to a scheduler that arbitrates between requests for a plurality of packets received at a plurality of ports of the first network device.

3. The method of claim 2, wherein the scheduler includes a first stage arbiter for arbitrating between requests received from a plurality of sub-ports of the plurality of ports.

4. The method of claim 1, wherein the group count reaches the maximum value when a number of packets grouped together equals a programmed maximum number of packets that can be grouped together.

5. The method of claim 2, wherein the scheduler includes a second stage arbiter for arbitrating between requests that are provided by a plurality of first stage arbiters of each port.

6. The method of claim 5, wherein when two requests have a same priority, then an oldest among the two requests is selected for processing by the second stage arbiter.

7. The method of claim 5, wherein when two requests have same priority and age, then a round robin method is used to select one of the requests by the second stage arbiter.

8. The method of claim 1, wherein the first network device is a switch element.

9. The method of claim 1, wherein the port includes a plurality of sub-ports configured to operate independently for sending and receiving information at a plurality of rates complying with a plurality of protocols.

10. The method of claim 9, wherein one of the plurality of sub-ports is configured to operate as a Fibre Channel port.

11. The method of claim 9, wherein one of the plurality of sub-ports is configured to operate as an Ethernet or Fibre Channel over Ethernet port.

12. A network device, comprising:
    a base-port having a plurality of sub-ports configured to operate independently as a port for sending and receiving packets at a plurality of rates complying with a plurality of protocols;
    a shared temporary memory storage device having a plurality of storage locations that are used to store packets received by the plurality of sub-ports; and
    a routing sequencer for determining a destination for a packet received for a sub-port for transmission to a destination port of another network device; wherein the routing sequencer is configured to determine if the packet is a start packet of a packet sequence; and when the packet is not the start packet of the packet sequence, determines whether the packet has a destination that is the same as a destination of a last prior packet; and when the packet is for the same destination, the routing sequencer increments a group count and saves the packet destination while elevating a priority of the packet, where the group count limits a number of packets whose priority is elevated based on the packet destination; and
    wherein to disable elevation of packet priority, the routing sequencer clears a group state that is activated when the start packet is received, a group packet destination, and the group count when the group count reaches a maximum value.

13. The network device of claim 12, wherein a request for transmitting the packet is sent to a scheduler having a plurality of first stage arbiters for arbitrating between requests received from a plurality of sub-ports of a plurality of base-ports.

14. The network device of claim 12, wherein the group count reaches the maximum value when a number of packets grouped together equals a programmed maximum number of packets that can be grouped together.

15. The network device of claim 13, wherein the scheduler includes a second stage arbiter for arbitrating between requests that are provided by the plurality of first stage arbiters and when two requests have a same priority, then an oldest among the two requests is selected for processing by the second stage arbiter.

16. The network device of claim 12, wherein the network device is a switch element.

17. The network device of claim 12, wherein one of the plurality of sub-ports is configured to operate as a Fibre Channel port.

18. The network device of claim 12, wherein one of the plurality of sub-ports is configured to operate as an Ethernet or Fibre Channel over Ethernet port.

19. A machine-implemented method for packet grouping in a network, the method comprising:
    receiving a packet at a receive segment of a port of a first network device for transmission to a destination port of a second network device;
    determining whether the packet has a destination that is the same as a destination of a last prior packet;
    when the packet is the start packet of the packet sequence, activating a group state that enables elevating processing priority for packets, incrementing a group count, saving the packet destination, and elevating a priority of the packet, where the group count limits priority elevation for packets to the same destination;
    sending a send request for the packet to a scheduler; and
    determining whether the group count has reached a maximum value;
    wherein the group count reaches the maximum value when a number of packets grouped together equals a programmed maximum number of packets that can be grouped together and when the group count has reached the maximum value, a routing sequencer for the network device clears a grouping state activated when a start of a packet sequence is received, a group destination, and the group count.

20. The method of claim 19, wherein the port includes a plurality of sub-ports configured to operate independently for sending and receiving information at a plurality of rates complying with a plurality of protocols.

* * * * *